United States Patent [19]

Gammache

[11] Patent Number: 4,914,555

[45] Date of Patent: Apr. 3, 1990

[54] RECHARGEABLE FLASHLIGHT

[76] Inventor: Richard J. Gammache, 1564 Mission Rd., Lancaster, Pa. 17601

[21] Appl. No.: 382,401

[22] Filed: Jul. 20, 1989

[51] Int. Cl.$^4$ .......................... H02J 7/00; H01M 10/46
[52] U.S. Cl. ..................................... 362/183; 362/202
[58] Field of Search ................................. 362/183, 202

[56] References Cited

U.S. PATENT DOCUMENTS

| 2,272,907 | 2/1942 | Deibel | 362/203 |
|---|---|---|---|
| 2,483,665 | 10/1949 | Phillips | 362/203 |
| 2,812,394 | 11/1957 | Smith | 362/183 |
| 2,876,410 | 3/1959 | Fry | 362/183 X |
| 3,787,678 | 1/1974 | Rainer | 362/183 |
| 3,829,676 | 8/1974 | Nelson et al. | 362/183 |
| 4,171,534 | 10/1979 | Strowe | 362/183 |
| 4,224,011 | 1/1981 | Hammel et al. | 362/183 |
| 4,472,766 | 9/1984 | Hung | 362/205 |
| 4,577,263 | 3/1986 | Maglica | 362/187 |
| 4,581,686 | 4/1986 | Nelson | 362/204 |
| 4,647,832 | 3/1987 | Fenne et al. | 362/183 X |
| 4,725,932 | 2/1988 | Gammache | 362/202 |
| 4,743,829 | 5/1988 | Fenne et al. | 362/183 |
| 4,794,315 | 12/1988 | Pederson et al. | 362/183 X |

Primary Examiner—Allen M. Ostrager

[57] ABSTRACT

A rechargeable flashlight includes a cylindrical casing containing a battery and an electronic circuit board for recharging the battery. A bulb is disposed in the casing, and a head assembly is rotatably mounted on one end of the casing for moving a flange on the bulb into contact with a terminal inside the casing thus completing an electrical circuit connecting the battery with the bulb and thereby illuminating the bulb. A knot is rotatably mounted adjacent the other end of the casing for extending and retracting a pair of prongs which may be plugged into an alternating current electrical receptacle in order to energize the circuit board and thereby recharge the battery.

19 Claims, 5 Drawing Sheets

Fig. 7
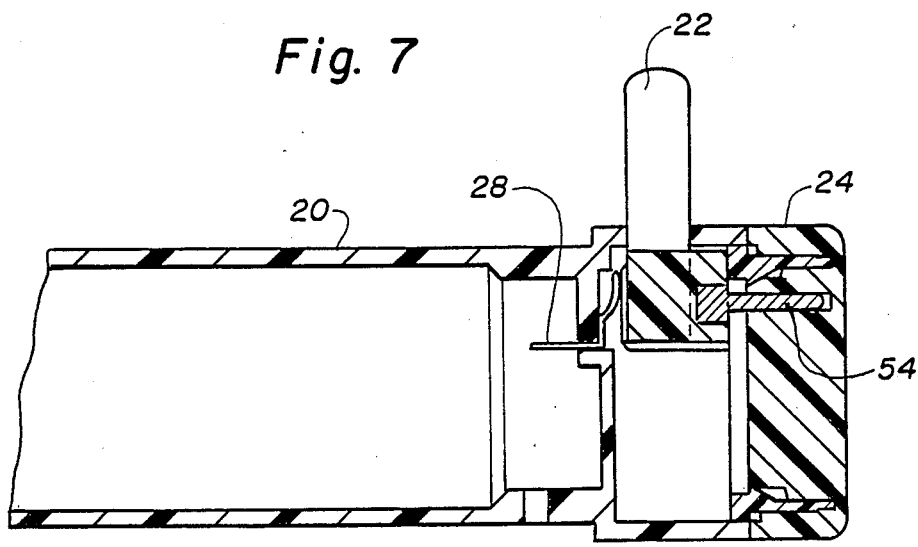
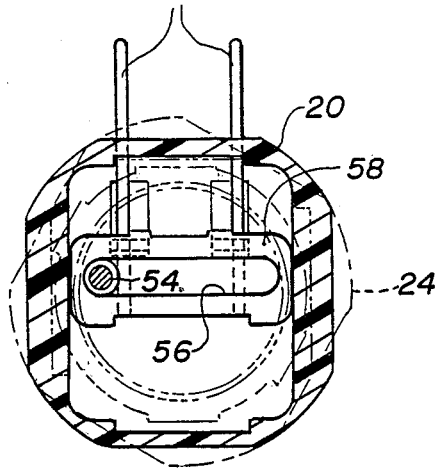
Fig. 8
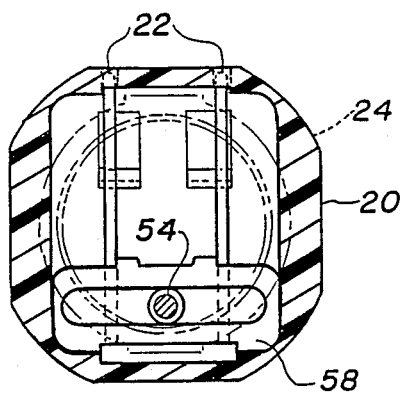
Fig. 9

RECHARGEABLE FLASHLIGHT

BACKGROUND OF THE INVENTION

This invention relates generally to flashlights and, in particular, to a rechargeable flashlight.

U.S. Pat. No. 4,647,832 granted Mar. 3, 1987 to K. R. Fenne et al discloses a rechargeable flashlight with a cylindrical casing and a slidable switch on one side thereof for rotating a pair of prongs between a retracted position within the casing and an extended position generally perpendicular to the casing. When the prongs are in their extended position, they may be plugged into a conventional electrical outlet to recharge the flashlight. This arrangement of the slidable switch and the rotatable prongs requires a considerable amount of space in the casing thereby substantially increasing the bulkiness of the flashlight. Furthermore, the slidable switch and rotatable prongs result in a flashlight which cannot be waterproofed and which lacks an aesthetic appearance.

SUMMARY OF THE INVENTION

The present invention provides a rechargeable flashlight which is less bulky and more aesthetic than previous rechargeable flashlights and which can be made waterproof.

A rechargeable flashlight according to the present invention comprises a casing containing a battery and means for recharging the battery, a bulb disposed in the casing, a head assembly rotatably mounted on one end of the casing for completing an electrical circuit connecting the battery and the bulb thereby illuminating the bulb, and a knob rotatably mounted adjacent the other end of the casing for extending and retracting a pair of prongs which may be plugged into an alternating current electrical receptacle in order to energize the recharging means and thereby recharge the battery.

DESCRIPTION OF THE DRAWINGS

FIGS. 7, 8 and 9 are sectional views of one end of the rechargeable flashlight of FIG. 1 illustrating the operation of certain parts.

DESCRIPTION OF THE PREFERRED EMBODIMENT

Figure 1:
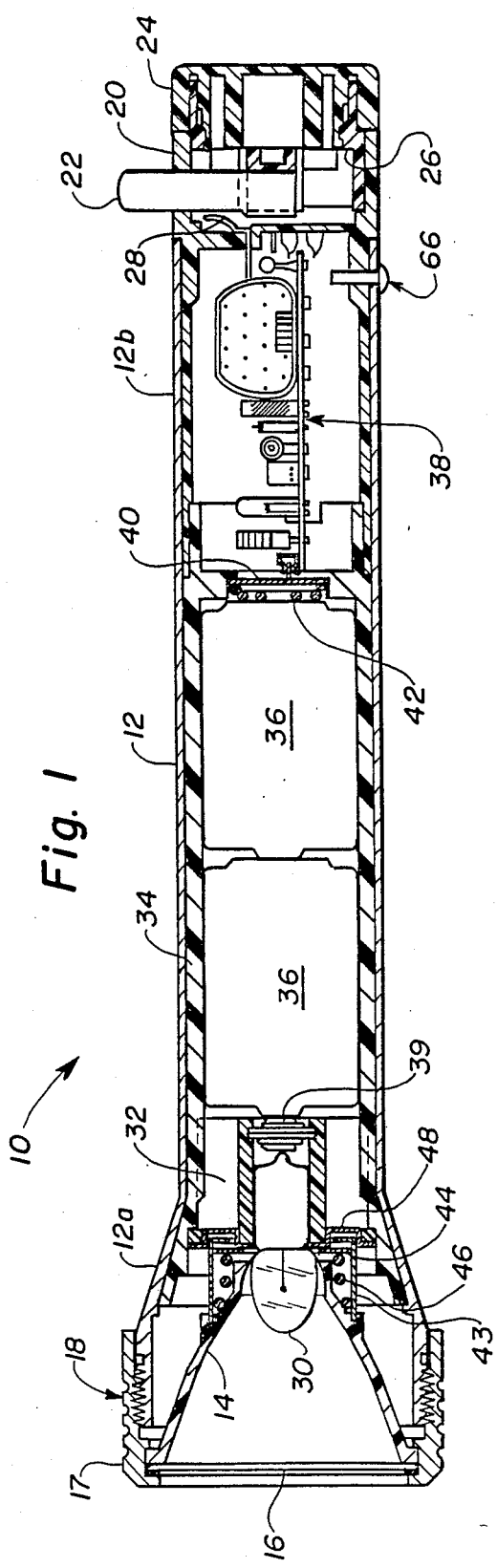
FIG. 1 is a sectional view of a rechargeable flashlight according to the preferred embodiment of the present invention.
Figure 2:
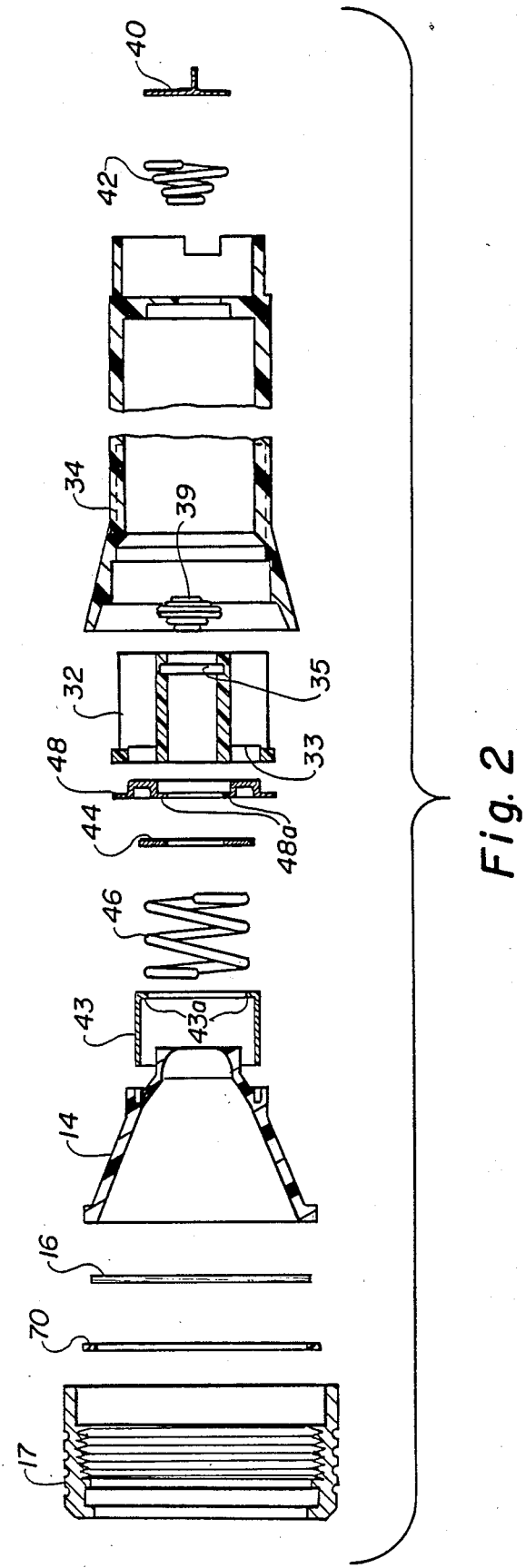
FIGS. 2, 3, 4, 5 and 6 are exploded views showing various parts of the rechargeable flashlight of FIG. 1.
Figure 3:
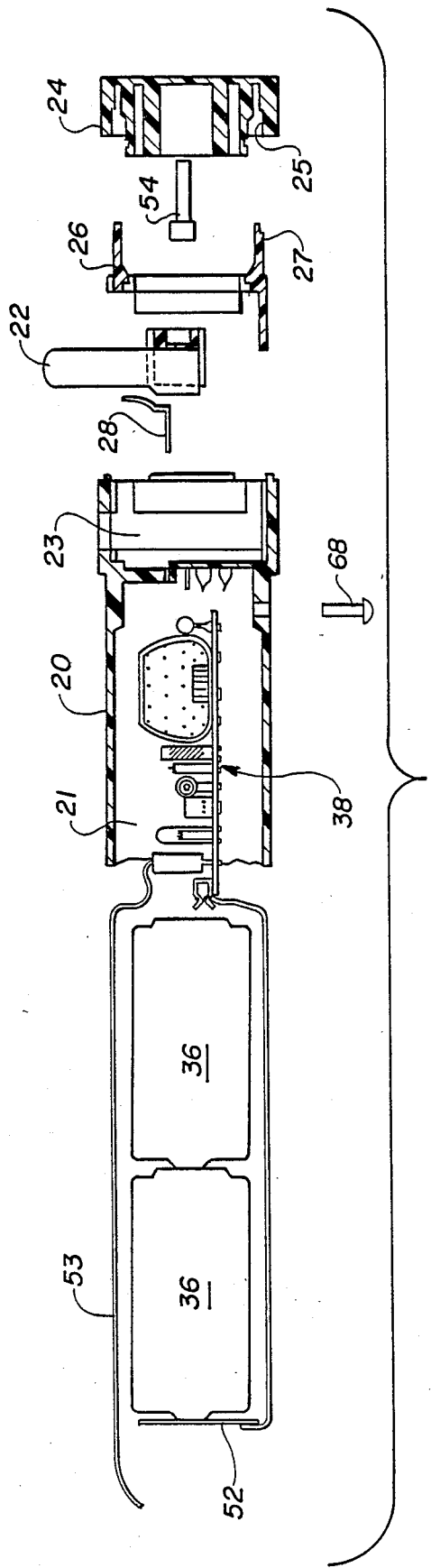
Figure 4:
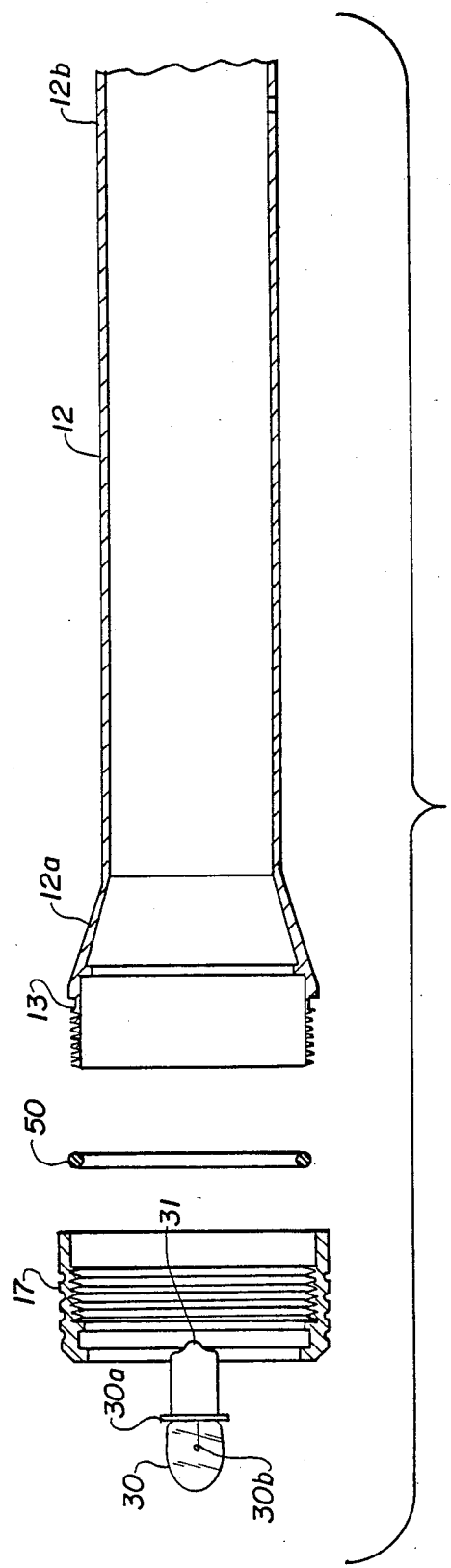
Figure 5:
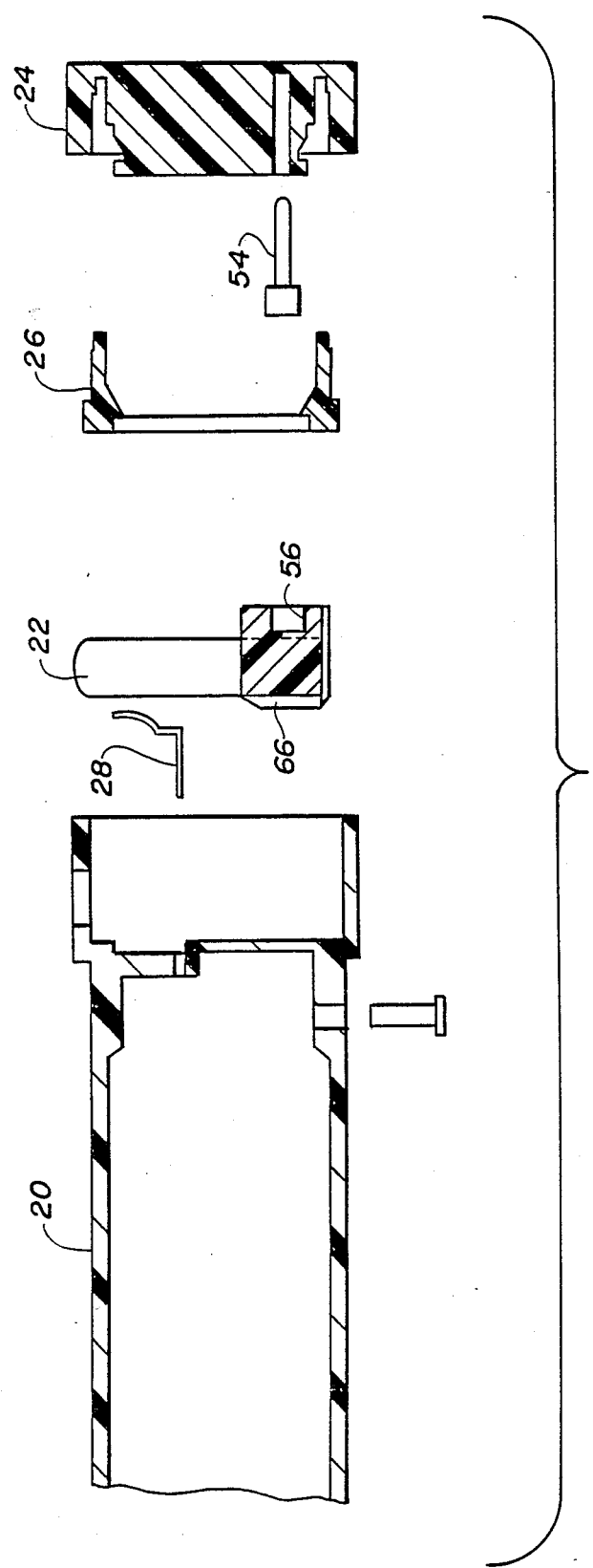
Figure 6:
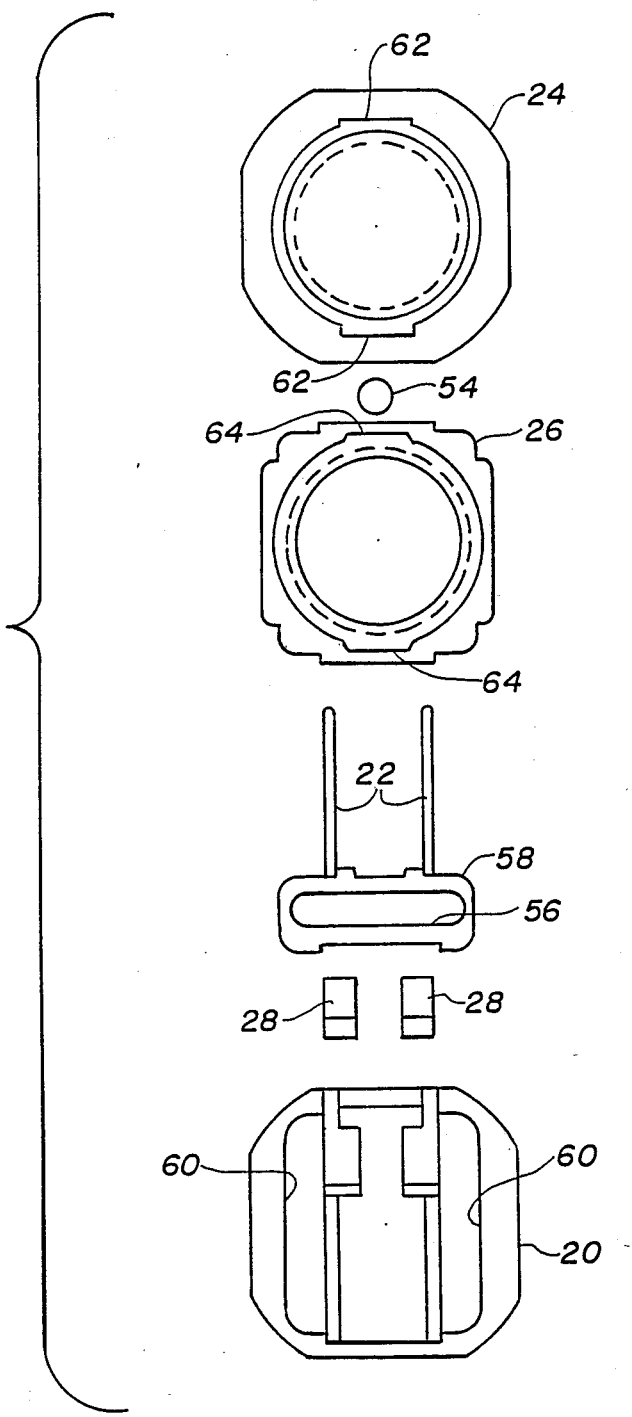

A rechargeable flashlight 10 according to the preferred embodiment of the present invention includes a cylindrical casing 12 formed of molded dielectric material flared open at one end 12a to receive a reflector 14 formed of plastic. The reflector 14 and a lens 16 are permanently retained in a cap 17 to form a head assembly 18 which is threaded onto the casing flared end 12a. The other end 12b of the casing 12 receives a partition member 20 having a pair of slots through which a pair of prongs 22 may be extended and retracted by rotating a knob 24 that is permanently secured to the partition member 20 by a guide member 26. Upon being fully extended by rotating the knob 24, the prongs 22 make electrical contact with two conductive leads 28 mounted in the partition member 20. When fully extended, the prongs 22 may be plugged into an alternating current electrical receptacle of preferably 120 volts.

The partition member 20 and the knob 24 are formed of nonconductive material and have corresponding external contours including matching flat surfaces which serve as tactual reminders of the extended and retracted positions of the prongs 22. In other words, with the prongs 22 in their extended and retracted positions, the flat surfaces on the knob 24 are aligned with the corresponding flat surfaces on the partition member 20. Thus, any misalignment of these matching flat surfaces indicates that the prongs 22 are not fully extended or retracted. It will be understood that the knob 24 may be rotated in either direction (i.e. clockwise or counterclockwise) to extend or retract the prongs 22. Also, the slots in the partition member 20, through which the prongs 22 are extended and retracted, are formed in one of the flat surfaces thereof.

The flashlight 10 is turned on and off and also focused by rotating the head assembly 18 relative to the casing 12. A bulb 30 is removably supported in a socket member 32 which is permanently mounted in an insulating shell 34 that encases rechargeable batteries 36. Socket member 32 and shell 34 are made of nonconductive material. An electronic circuit board 38 is connected electrically to the batteries 36 by a first terminal 40 and a spring 42. The circuit board 38 may also be connected electrically to the prongs 22 by the leads 28 when the prongs 22 are fully extended. The partition member 20 has internal rails molded therein for guiding the circuit board 38 during assembly of flashlight 10 and for supporting the circuit board 38 in its permanent seated position within flashlight 10. A double conical spring 39 carried in the socket member 32 electrically connects the batteries 36 with the bulb 30.

The head assembly 18 includes a sleeve 43 permanently secured at one end to the reflector 14 and a pressure pad 44 carried within the other end of the sleeve 42. A spring 46 normally urges the pad 44 against an annular flange 43a on the sleeve 43. The pad 44 is arranged to engage an annular flange 30a on the bulb 30 in order to move the bulb flange 30a into electrical contact with an inner flange 48a of a second terminal 48 which is disposed in a groove 33 in the socket member 32. It will be understood that the spring 39 normally urges the bulb flange 30a out of contact with the terminal inner flange 48a. An O-ring 50 is disposed in a groove 13 in the flared end 12a of the casing 12 to provide a hermetic seal between casing 12 and head assembly 18. To replace the bulb 30, the head assembly 18 is unthreaded from the casing 12 and the bulb 30 is lifted out of the socket member 32. A new bulb 30 is inserted in the socket member 32 and the head assembly 18 is threaded back onto the casing 12. The head assembly 18 consists of reflector 14, lens 16, cap 17, sleeve 43, pressure pad 44, spring 46 and O-ring 50.

When it is desired to turn on the flashlight 10, the head assembly 18 is rotated in a clockwise direction (i.e. thread tightening as viewed from the flared end 12a of the casing 12) until the pressure pad 44 engages the bulb flange 30a and moves it into contact with the terminal inner flange 48a. This completes an electrical circuit connecting the bulb 30 and the batteries 36 thereby illuminating the bulb 30. Continued rotation of the head assembly 18 in the same clockwise direction focuses the light emitted by the bulb 30 by moving the reflector 14 relative to the bulb filament 30b. Still further rotation of the head assembly 18 in the same clockwise direction results in a wide angle beam of light from the bulb 30. The O-ring 50 provides sufficient friction to retain the head assembly 18 in any adjusted position.

Subsequent rotation of the head assembly 18 in a counter clockwise direction (i.e. thread untightening as viewed from the casing flared end 12a) permits the bulb flange 30a to be moved away from the terminal inner flange 48a by the spring 39. The middle coils of the spring 39 are captured in grooves 35 in the socket member 32. Spring 39 provides a circular electrical contact with the center terminal 31 of bulb 30 and with a terminal plate 52 which is connected to a terminal of one of the batteries 36. An electrical lead 53 extends between circuit board 38 and second terminal 48.

Spring 46 in head assembly 18 is preloaded during assembly of flashlight 10 with sufficient force to urge the bulb flange 30a into contact with the terminal inner flange 48a by compressing the spring 39 without further changing the preloaded length of spring 46. Pressure pad 44 is located at a point equal to the distance between the bulb flange 30a and the bulb filament 30b when the position of the bulb filament 30b coincides with the focal point of the reflector 14.

During assembly of flashlight 10, mating ends of shell 34 and partition member 20 slide together and become permanently locked in place. Partition member 20 has a first compartment 21 for containing the circuit board 38 and a second compartment 23 for housing the prongs 22. The prongs 22 are extended from and retracted into the compartment 21 by rotating the knob 24. The exterior shape of the knob 24 matches the exterior shape of the adjacent end of partition member 20. That is, the exterior adjoining shapes of the knob 24 and the partition member 20 are generally in the form of a square with rounded corners and flat surfaces. The flat surface of the partition member 20 through which the prongs 22 are extended may be pushed directly against a conventional electrical receptacle.

The two electrical leads 28 are preferably molded into the partition member 20 for engagement with the prongs 22 when fully extended. The prongs 22 are assembled within the compartment 23 of partition member 20 and guide member 26 is preferably welded ultrasonically into the partition member 20 after the prongs 22 are inserted in compartment 23. Knob 24 and cam roller 54 are then pressed together and permanently retained on casing 12 by inserting locking ring 27 on guide member 26 into mating groove 25 in knob 24.

To recharge the batteries 36, the knob 24 is rotated ½ revolution (180 degrees) in either direction. The cam roller 54 mounted in the knob 24 is engaged in a cam slot 56 molded into a base 58 supporting the prongs 22. As knob 24 is rotated, the cam roller 54 lifts the prongs 22 out of their compartment 23 in the partition member 20 and through the slots in one the flat surfaces of the partition member 20. The prong base 58 is supported for sliding movement in a channel or keyway formed by guiding surfaces 60 molded within partition member 20. As the knob 24 is rotated through ½ revolution, it leaves its matching relationship with the partition member 20 but returns to such matching relationship as it snaps into place at the completion of ½ revolution. Internal flats 62 on knob 24 detent against external flats 64 on guide member 26 to hold the knob 24 in position with the prongs 22 fully extended. As the prongs 22 approach the extended position, electrical contact is made between the leads 28 and bosses 66 on the prongs 22. This electrical contact provides a path for the alternating current when prongs 22 are plugged into a receptacle. When the circuit board 38 is energized by the alternating current, an LED displays light through a fibre optic or acrylic member 68 thus indicating a recharging mode.

For the flashlight 10 to again function as a portable light source, the prongs 22 are removed from the receptacle and the knob 24 is rotated ½ revolution in either direction thereby returning the prongs 22 to their retracted position within the compartment 23 of partition member 20. The bosses 66 on the prongs 22 are moved out of contact with the leads 28.

The circuit board 38 intended for use in the rechargeable flashlight 10 is of conventional design and includes various components. These components consist of diodes, rectifiers, resistors, capacitors, and printed circuits to provide conversion of alternating current to direct current for recharging the batteries 36, for preventing overcharging of the batteries 36, for indicating the recharging mode, and for protection against short circuits.

The flashlight 10 is hermetically sealed by conventional means such as O-ring 50 between casing 12 and cap 17, and gasket 70 between lens 16 and cap 17. This protects the bulb 30, batteries 36 and circuit board 38 from moisture and other contaminants.

It will be understood that the self contained, retractable prong, recharging system of the present invention is adaptable to many hand held electrical devices intended for operation with rechargeable batteries.

What is claimed is:

1. A rechargeable flashlight comprising:
   a casing containing a battery and means for recharging said battery;
   a bulb disposed in said casing;
   a head assembly rotatably mounted on one end of said casing for completing an electrical circuit connecting said battery and said bulb thereby illuminating said bulb; and
   a knob rotatably mounted adjacent the other end of said casing for extending and retracting a pair of prongs which may be plugged into an alternating current electrical receptacle in order to energize said recharging means and thereby recharge said battery.

2. The rechargeable flashlight of claim 1, wherein said recharging means comprises an electronic circuit board which is connected to said prongs when said prongs are moved from a retracted position into an extended position.

3. The rechargeable flashlight of claim 2, further comprising a pair of conductive leads disposed in said casing for connecting said electronic circuit board to said prongs when said prongs are in said extended position.

4. The rechargeable flashlight of claim 3, wherein said electronic circuit board is electrically connected to said battery by a first terminal and a spring disposed in said casing.

5. The rechargeable flashlight of claim 4, wherein said head assembly comprises a pad for engaging a flange on said bulb in order to move said bulb flange into contact with a second terminal disposed in said casing thereby completing said electrical circuit and illuminating said bulb.

6. The rechargeable flashlight of claim 5, wherein said head assembly further comprises a reflector, a sleeve secured to said reflector, and a spring normally urging said pad against a flange on said sleeve.

7. The rechargable flashlight of claim 6, wherein said bulb flange contacts an inner flange on said second terminal to complete said electrical circuit.

8. The rechargeable flashlight of claim 7, further comprising a socket member disposed in said casing for supporting said bulb.

9. The rechargeable flashlight of claim 8, further comprising another spring carried by said socket member for electrically connecting said bulb and said battery, said another spring urging said bulb flange away from said second terminal inner flange.

10. The rechargeable flashlight of claim 9, further comprising a partition member disposed between said other end of said casing and said knob, said partition member having a first compartment for receiving said electronic circuit board and a second compartment for receiving said prongs when said prongs are retracted.

11. The rechargeable flashlight of claim 10, wherein said partition member has a pair of slots through which said prongs are extended and retracted.

12. The rechargeable flashlight of claim 11, wherein said knob and said partition member have matching exterior contours which are aligned when said prongs are in said retracted and extended positions.

13. The rechargable flashlight of claim 12, wherein said matching exterior contours include corresponding flat surfaces on said knob and said partition member which are positioned in alignment to indicate when said prongs are in said retracted and extended positions.

14. The rechargeable flashlight of claim 13, wherein said slots are formed in one of said flat surfaces on said partition member.

15. The rechargeable flashlight of claim 14, further comprising a cam roller attached to said knob engageable in a cam slot formed in a base which supports said prongs.

16. The rechargeable flashlight of claim 15, wherein said prong base is supported for sliding movement in a channel formed within said partition member.

17. The rechargeable flashlight of claim 16, wherein said knob is rotated ½ revolution to move said prongs between said retracted and extended positions.

18. The rechargeable flashlight of claim 17, further comprising a guide member mounting said knob on said partition member.

19. The rechargeable flashlight of claim 18, wherein said knob and said guide member have mating flats which detent against each other to hold said prongs in said retracted and extended positions.

* * * * *